United States Patent
Garvey

(10) Patent No.: US 6,648,124 B1
(45) Date of Patent: Nov. 18, 2003

(54) PRODUCT PATH SPLITTING AND MERGING CONVEYOR SYSTEM

(75) Inventor: Mark C. Garvey, Cedarbrook, NJ (US)

(73) Assignee: Garvey Corporation, Blue Anchor, NJ (US)

(*) Notice: Subject to any disclaimer, the term of this patent is extended or adjusted under 35 U.S.C. 154(b) by 0 days.

(21) Appl. No.: 10/263,298

(22) Filed: Sep. 19, 2002

(51) Int. Cl.⁷ .................. B65G 47/26; B65G 47/68; B65G 37/00
(52) U.S. Cl. .................. 198/418.6; 198/445; 198/452; 198/580; 198/447
(58) Field of Search .................. 198/418.6, 418.7, 198/431, 445, 446, 447, 432, 580, 452

(56) References Cited

U.S. PATENT DOCUMENTS

| | | | | |
|---|---|---|---|---|
| 2,699,278 A | * | 1/1955 | Wysocki | 198/446 |
| 3,604,551 A | * | 9/1971 | Fink | 198/580 |
| 4,037,710 A | * | 7/1977 | Brutcher | 198/580 |
| 4,401,207 A | * | 8/1983 | Garvey | 198/580 |
| 4,925,003 A | * | 5/1990 | Limoni | 198/452 |
| 5,079,896 A | * | 1/1992 | Langen et al. | 53/54 |
| 5,673,783 A | * | 10/1997 | Radant et al. | 198/418.6 |
| 6,168,005 B1 | * | 1/2001 | Petrovic | 198/447 |

* cited by examiner

Primary Examiner—Gene O. Crawford
(74) Attorney, Agent, or Firm—Stuart M. Goldstein

(57) ABSTRACT

A continuous product conveyor system of loop configuration is provided to receive products from an upstream destination in a given product delivery path arrangement and to deliver those products to a downstream destination in a different product delivery path arrangement. The system is adapted, for example, to deliver a single file product path from an upstream destination and deliver multiple delivery paths downstream. The system also can be used to receive multiple product delivery paths from an upstream destination and deliver a single file product path or a different number of product paths downstream. The system can further be used for receiving mass product flow and delivering one or more product delivery paths downstream.

15 Claims, 4 Drawing Sheets

PRODUCT PATH SPLITTING AND MERGING CONVEYOR SYSTEM

BACKGROUND OF THE INVENTION

Conveyor systems are routinely used to handle and transport products between upstream and downstream destinations located in different and sometimes remote sections of a facility. In a normal operation of this type, products are placed on a conveyor at the upstream location, for instance at one operational station, and then they are transported to the downstream operation by conveyor where the next step in the manufacture or distribution of the products take place.

Often, the process includes upstream machines providing product which must be fed to downstream product receiving machines via different product delivery streams or paths. For example, a single upstream machine may output products by means of a single product path, but there may be a need to supply a downstream machine or machines with multiple product infeed delivery paths. Similarly, an upstream operation, e.g. two separate upstream product machines, may supply products by means of dual product delivery paths, wherein the downstream operation may require input by means of a single product path.

The above are cited only as examples. It can be appreciated that there are conveying systems with multiple different upstream to downstream product path delivery requirements, depending on the industry and need.

To date, no product path splitting and merging system has been developed which smoothly and efficiently divides upstream products into two or more outfeeds or combines products from multiple upstream sources to a single feed or to a different number of outfeed paths.

U.S. application Ser. No. 09/984,682, and now U.S. Pat. No. 6,575,287 relates to a product conveying and accumulation system with multiple conveyors, including product supply and discharge conveyors and an accumulator conveyor. The accumulator conveyor in this co-pending application efficiently and smoothly receives product for accumulation, should there be a disruption in the system, and for effectively delivering product to conveyors for distribution to downstream destinations, after the disruption is addressed. However, an important consideration not included in this application, and inadequately addressed by prior conveyor systems, concerns the need for such systems to have the ability to effectively split and/or merge product delivery paths, as the need arises.

The current invention is not an accumulator system, but employs some of the principles disclosed in application Ser. No. 09/984,682, to accomplish conveyor system product path line splitting and merging.

SUMMARY OF THE INVENTION

It is thus the object of the present invention to overcome the limitations and disadvantages of prior product path delivery conveyor systems.

It is an object of the present invention to provide a product conveying system which can receive a single product delivery path or multiple product delivery paths from an upstream destination and smoothly, efficiently and effectively output products to a downstream destination in a single delivery path or multiple delivery paths.

It is a further object of the present invention to provide a product conveying system which employs the use of a continuous loop conveyor system to accept products from an upstream destination, traveling in one or more product delivery paths, and to distribute those products to a downstream destination in different product delivery path configurations.

These and other objects are accomplished by the present invention which consists of a continuous product conveyor system of loop configuration, designed to receive products from an upstream destination in a given product delivery path arrangement and to deliver those products to a downstream destination in a different product delivery path arrangement. The system is adapted, for example, to deliver a single file product path from an upstream destination and deliver multiple delivery paths downstream. The system also can be used to receive multiple product delivery paths from an upstream destination and deliver a single file product path or a different number of product paths downstream. The system can further be used for receiving mass product flow and delivering one or more product delivery paths downstream.

Novel features which are considered as characteristic of the invention are set forth in particular in the appended claims. The invention, itself, however, both as to its design, construction and use, together with the additional features and advantages thereof, are best understood upon review of the following detailed description with reference to the accompanying drawings.

DETAILED DESCRIPTION OF THE INVENTION

Figure 1:
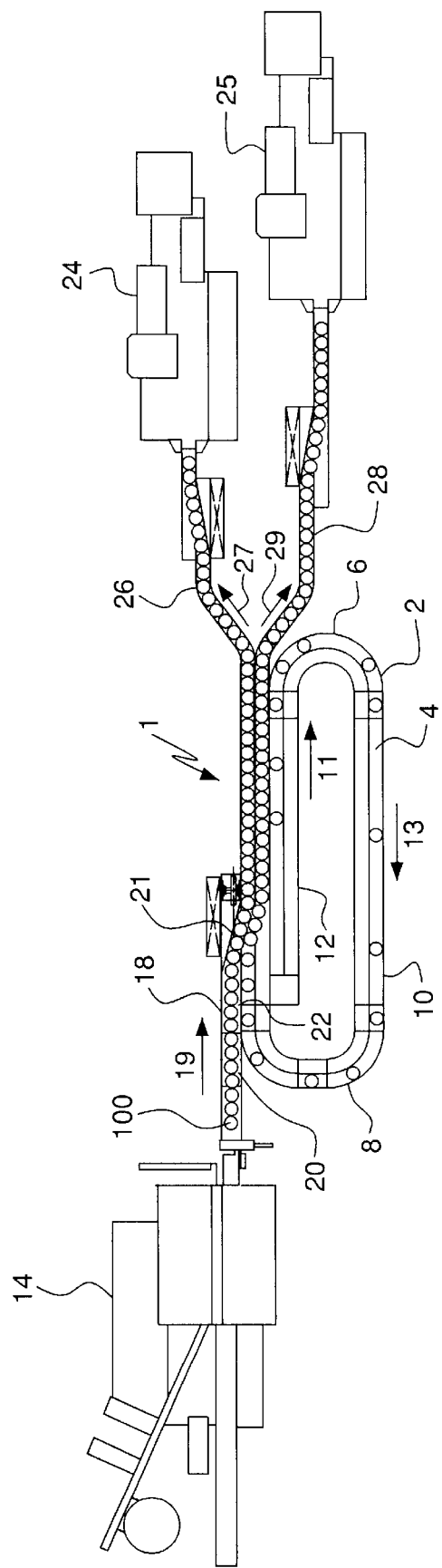
FIG. 1 is one embodiment of the present invention showing a single product feed and dual product discharge configuration.

FIG. 1 shows a first embodiment of the product conveyor system of the invention. System 1 comprises conveyor 2, a continuous conveyor with a planar surface 4. Conveyor 2 is looped in configuration with curved and sections 6 and 8 and straight runs 10 and 12. Conveyor 2 traveling in the direction indicated by arrows 11 and 13, is similar in basic configuration to the system described in detail in the aforereferenced Ser. No. 09/984,682, directed to an accumulation system. However, the present system is not an accumulator, but is configured to receive products from upstream destinations, in one or more designated product delivery streams or paths, and deliver those products downstream in a different number of delivery path or paths. System 1 in FIG. 1 shows a single upstream machine 14 delivering products 100, via conveyor 18, in a single product delivery path shown at 20. Conveyor 18, traveling in the direction indicated by arrow 19, is in adjacent alignment to conveyor 2 at location 22 and both conveyors are moving in the same direction at this adjacent alignment location. Products 100 on path 20 travel onto conveyor 2, which transports the products on its planar surface 4. Some of the products 100 are transported in the direction indicated by arrow 27 directly to downstream machine 24, via single product delivery path 26. Other products 100 are transported in the direction indicated by arrow 29, via a single product delivery path 28. A guide rail 21 or similar guiding device insures that products 100 remain in their designated paths. Products 100 which do not proceed directly to paths 26 and 28, are moved around the loop of conveyor 2, where they eventually are lined up with and enter paths 26 and 28 and proceed to machines 24 and 25. By this configuration, an upstream supply of products in a single delivery path are smoothly and efficiently transported downstream in two separate delivery paths—in this case to two different parallel machines, each requiring a single file input.

Figure 2:
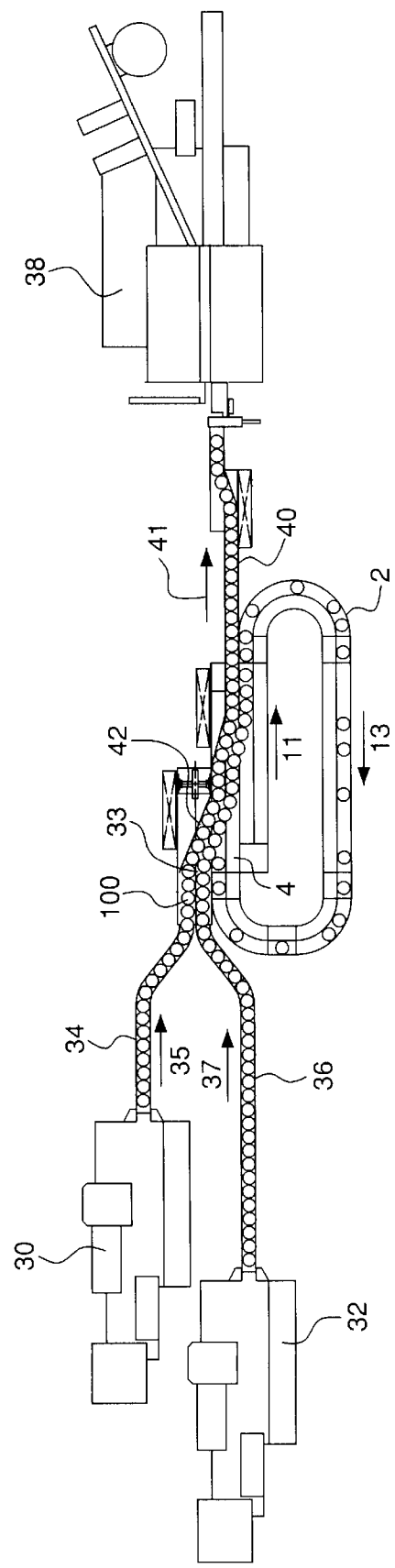
FIG. 2 is a second embodiment of the present invention showing a single product feed and multiple product discharge configuration.

FIG. 2 shows a second use of the product conveyor system this invention. In this use, conveyor 2 receives products 100 from two parallel upstream machines 30 and 32, each with single product paths 34 and 36, traveling in the direction of arrows 35 and 37 respectively. Conveyor 2 is traveling in the same direction as shown in FIG. 1 and is in adjacent alignment to conveyors 34 and 36 at location 33, where the conveyors are moving in the same direction. Products 100 enter conveyor 2 via these two paths, where they are guided by rails 42 or similar guides, on planar surface 4 of the conveyor. Some of the products 100 are transported directly to downstream machine 38 via single product delivery path 40, traveling in the direction of arrow 41. Products 100 which do not proceed directly to path 40 are moved around the loop of conveyor 2, where they are eventually lined-up with and enter path 40 and proceed to machine 38. By this configuration, an upstream supply of products in two independent product delivery paths is smoothly and efficiently merged and transported downstream in a single delivery path, to a machine requiring single file input.

Figure 3:
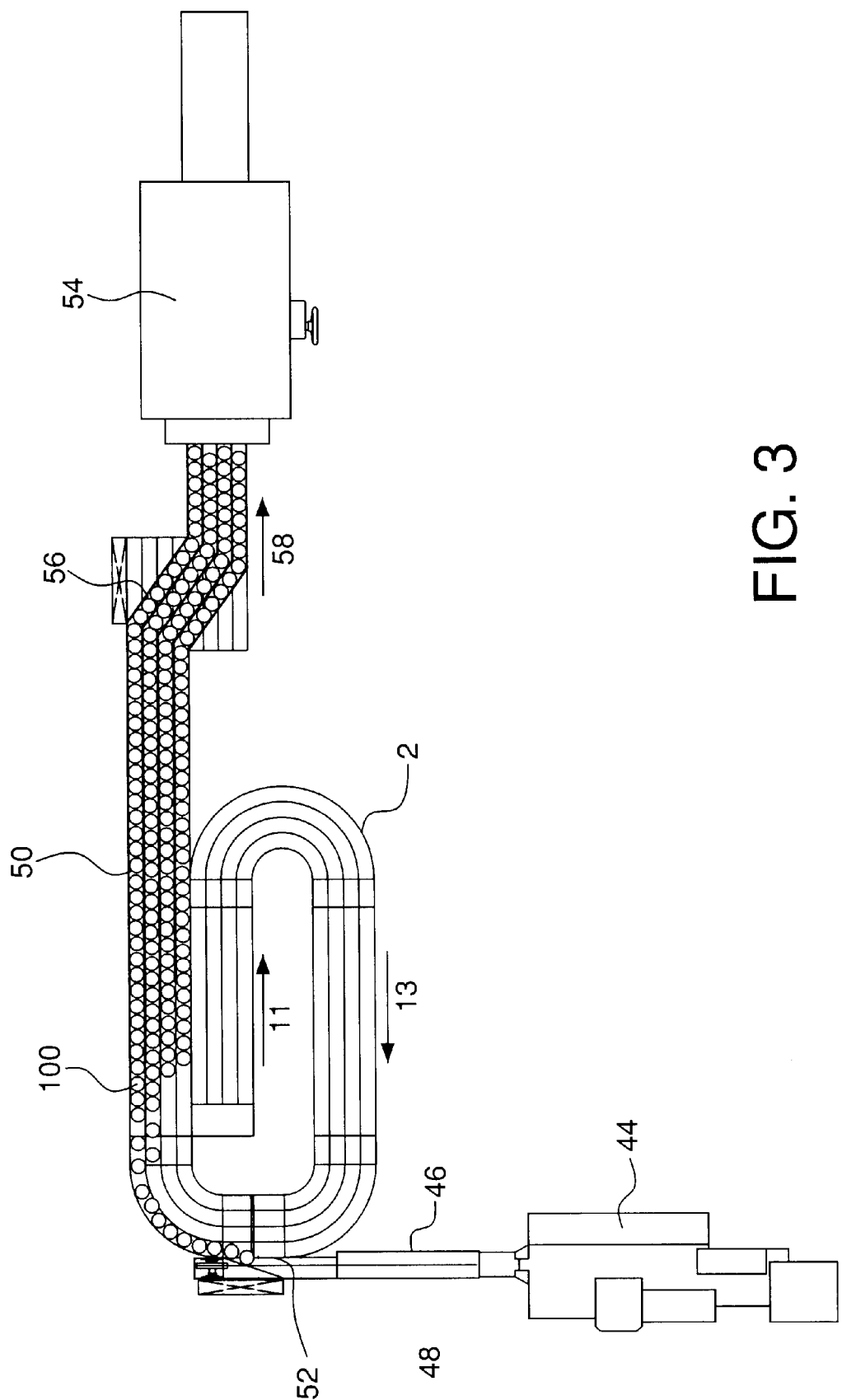
FIG. 3 is a third embodiment of the present invention showing a dual product feed and single product discharge configuration.

FIG. 3 shows yet another use of the product conveyor system of this invention. In this use, conveyor 2 receives products 100 from a single upstream machine 44, via conveyor 46, traveling in the direction indicated by arrow 48. Conveyor 2 is traveling in the same direction as shown in FIG. 1. Conveyor 46 is in adjacent alignment to conveyor 2 at location 52 and both conveyors are moving in the same direction at this location. Products 100 received by conveyor 2 are transported to delivery section 50, comprising four separate delivery paths. Products 100 are directed to downstream machine 54, on these four paths, by rails 56 or similar guides, in the direction of arrow 58. Products 100 which are not directly aligned for delivery to section 50, are directed onto the loop of conveyor 2, where they are eventually positioned for movement onto section 50. By this configuration, an upstream supply of products in a single product delivery path is smoothly and efficiently merged and transported downstream via multiple delivery paths, to a machine requiring multiple file input.

Figure 4:
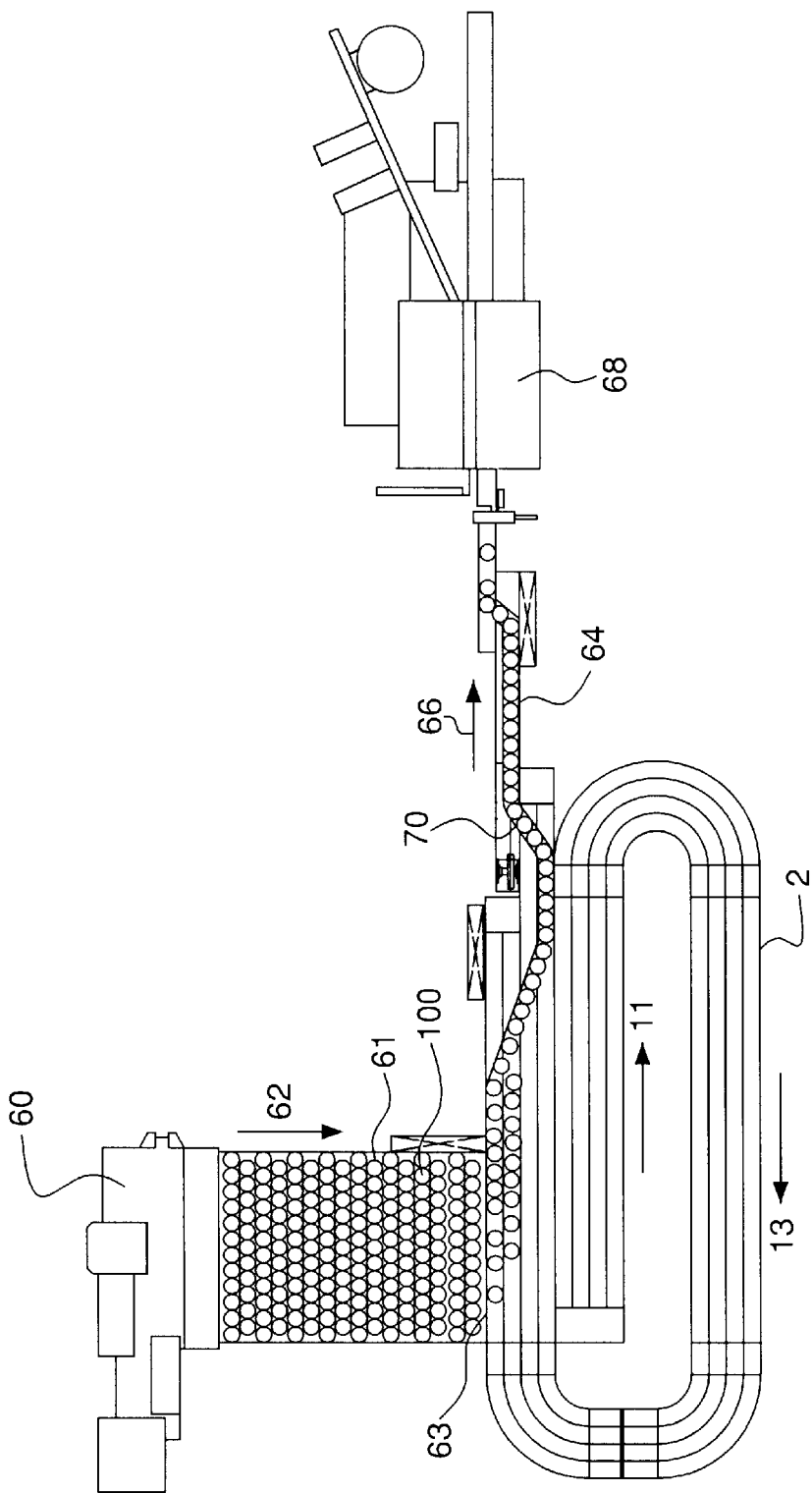
FIG. 4 is a fourth embodiment of the present invention showing mass product flow feed and single product discharge configuration.

FIG. 4 shows still another use of the product conveyor system of this invention. In this use, products 100 are delivered to conveyor 2 as a mass flow of product from upstream machine 60, via conveyor 61, traveling in the direction indicated by arrow 62. Conveyors 2 and 61 are in adjacent alignment with each other at location 63 and move in coordinated relation. Conveyor 2, traveling in the same direction as shown in FIG. 1, transports products 100 received from conveyor 61 for delivery, via single conveyor 64, traveling in the direction indicated by arrow 66, to downstream machine 68. Rails 70 or similar guides, direct products 100 onto conveyor 64. By this configuration, an upstream mass of products is smoothly and efficiently merged and transported downstream in a single delivery path, to a machine requiring single file input.

Certain novel features and components of this invention are disclosed in detail in order to make the invention clear in at least one form thereafter. However, it is to be clearly understood that the invention as disclosed is not necessarily limited to the exact form and details as disclosed, since it is apparent that various modifications and changes may be made without departing from the spirit of the invention.

Thus, this invention discloses a continuous product conveyor system which is configured to receive products from an upstream destination in a given product delivery path arrangement and to deliver those products, efficiently and smoothly, to a downstream destination in a different product delivery path arrangement. While specific product infeed and outfeed configurations are discussed herein, this invention is not limited to those configurations, but instead contemplates any system in which there are a different number of upstream product delivery paths supplying the conveyor system than downstream product delivery paths exiting the system. For example, this includes but is not limited to, systems with dual infeed paths and three or more outfeed paths and three or more infeed paths and one or two outfeed paths.

I claim:

1. A product conveying system comprising:
   (a) first conveying means for the movement of products from an upstream destination, said first conveying means comprising a designated number of product delivery path means on which the products are moved;
   (b) second conveying means for receiving products from the first conveying means and for movement of products onto and around the product conveying system for delivery of products to a downstream destination, said second conveying means comprising looped planar surfaces which move products in a substantially continuous loop, at least one section of the first conveying means being in substantial adjacent alignment with at least one section of the second conveying means, both conveying means, at all times, when in adjacent alignment, moving in pre-coordinated relation with each other;
   (c) a designated number of product delivery path means for moving products from the second conveyor means to a downstream destination, the number of product delivery path means from the second conveying means being different from the number of product delivery paths of the first conveying means;
   (d) guide means for delivering products to the downstream destination on the designated product delivery path means from the second conveying means.

2. The product conveying system as in claim 1 wherein the first conveying means and the second conveying move in substantially the same direction when in adjacent alignment.

3. The product conveying system as in claim 1 wherein the designated delivery path means of the first conveying means comprises a mass product flow path and the delivery path means from the second conveying means comprises one product path.

4. The product conveying system as in claim 1 wherein the delivery path means of the first conveying means and from the second conveying means each comprise one or more product paths.

5. The product conveying system as in claim 4 wherein the number of product paths of the first conveying means is greater than the number of product paths from the second conveying means.

6. The product conveying system as in claim 4 wherein the number of product paths from the second conveying means is greater than the number of product paths of the first conveying means.

7. The product conveying system as in claim 4 wherein the first conveying means comprises one product path and delivery path means from the second conveying means comprises two product paths.

8. The product conveying system as in claim 4 wherein the first conveying means comprises one product paths and the delivery path means from the second conveying means comprises four product paths.

9. The product conveying system as in claim 4 wherein the first conveying means comprises two product paths and the delivery path means from the second conveying means comprises one product path.

10. The product conveying system as in claim 4 wherein the first conveying means comprises four product paths and the delivery path means from the second conveying means comprises one product path.

11. A method of conveying products by means of a product conveyor system, said method comprising the steps of:

transporting products from an upstream destination onto a first conveyor system;

moving the first conveyor system at a predetermined speed;

transporting products on the first conveyor system by means of a designated number of product delivery paths means;

aligning a second conveyor system comprising a substantially continuous loop and a designated number of product delivery path means substantially adjacent to and contiguous with the first conveyor system;

moving the second conveyor system at a predetermined speed in tandem with the first conveyor system;

transferring product from one or more of the designated product delivery path means of the first conveyor system to the second conveying system;

moving product on and around the second conveying system;

positioning product on the second conveying system in order to deliver product to a downstream destination on a different number of designated product delivery path means than the designated product delivery path means of the first conveying system; and transferring products to a downstream destination from the second conveyor system by means of a greater number of designated product delivery paths than the designated product delivery paths of the first conveyor system.

12. The method of claim 11 comprising the further step of moving the second conveyor system in the same direction as the first conveyor system at the adjacent alignment.

13. The method as in claim 11 comprising the further step of moving the first conveyor system and the second conveyor system at substantially similar predetermined speeds.

14. The method as in claim 11 comprising the further step of moving the first conveyor system and the second conveyor system at substantially the same speeds.

15. The method as in claim 11 comprising the further step of providing a guide means for delivering products to the downstream destination on the designated product delivery paths means from the second conveying means.

* * * * *